(12) United States Patent
Estrada et al.

(10) Patent No.: US 7,930,187 B2
(45) Date of Patent: Apr. 19, 2011

(54) METHOD AND SYSTEM FOR COLLABORATIVE COMMUNITY MEMBERSHIP MANAGEMENT

(75) Inventors: Miguel A. Estrada, Hollis, NH (US);
Joseph A. Russo, Westford, MA (US);
Thomas M. Spine, Londonderry, NH (US)

(73) Assignee: International Business Machines Corporation, Armonk, NY (US)

( * ) Notice: Subject to any disclaimer, the term of this patent is extended or adjusted under 35 U.S.C. 154(b) by 2363 days.

(21) Appl. No.: 10/731,823

(22) Filed: Dec. 9, 2003

(65) Prior Publication Data
US 2005/0125277 A1    Jun. 9, 2005

(51) Int. Cl.
*G06Q 10/00* (2006.01)

(52) U.S. Cl. .......................................... 705/1.1

(58) Field of Classification Search ................ 705/1, 1.1
See application file for complete search history.

(56) References Cited

U.S. PATENT DOCUMENTS

| 2003/0050986 A1* | 3/2003 | Matthews et al. ............. 709/206 |
| 2004/0122693 A1* | 6/2004 | Hatscher et al. ................... 705/1 |

* cited by examiner

*Primary Examiner* — Jonathan Ouellette
(74) *Attorney, Agent, or Firm* — Steven M. Greenberg, Esq.; Carey, Rodriguez, Greenberg & Paul, LLP

(57) ABSTRACT

A method and system for managing membership in a collaborative computing environment community are provided. Identification of a selected a group of end user persons to invite to join the collaborative computing community is received. The selected group is evaluated to identify one or more invitees there from. The one or more identified invitees are invited to join the community. An indication from one or more invitees that the invitee wishes to join the community is received.

20 Claims, 3 Drawing Sheets

METHOD AND SYSTEM FOR COLLABORATIVE COMMUNITY MEMBERSHIP MANAGEMENT

BACKGROUND OF THE INVENTION

1. Statement of the Technical Field

The present invention relates to collaborative computing environments and, in particular, to managing memberships in a collaborative computing environment community through an invitation process.

2. Description of the Related Art

Collaborative computing provides a means for users to pool their strengths and experiences to achieve a common goal. For example, a common goal may be an educational objective, the completion of a software development project or even creation and use of a system to manage human resources. The establishment of a collaborative computing environment typically involves the creation or definition of a community. The community provides the framework under which the collaborative computing objective is achieved.

A collaborative computing community is defined by (1) a particular context, i.e. the objective of the community, (2) membership, i.e., the participants in the community, and (3) a set of roles for the community members. Roles are names given to the people in the community which dictate access to the community's resources and tools as well as define the behavior of the community members. Community creators or administrators may desire that the specific roles have specific access and policy attributes for the different business components, i.e. tools, resources, etc. within the community.

Collaborative computing environment users can become members of a community instance within the environment in one of two ways. First, users can become members by having an administrator configure the environment and community to add the user as a member. Second, the user may be an existing or new user within the environment and may end up joining the community as a member of a group if the group joins the community. Groups are made up of multiple users who typically share a common interest. For example, the marketing group may include all users who are in the marketing department. In the latter case, an administrator likely added the group to the community so the user may have had no idea that he or she became a community member other that the sudden influx of junk or other unwanted email and other correspondence such as the arrival of a weekly email subscribed to by the marketing group. This arrangement leads to unhappy community members.

Current systems do not allow users who are members of a community by virtue of their inclusion in a group to terminate membership in the absence of having an administrator remove them. Also, current systems using opt-in email send email to all users of a group that has opted in. As such, the member may continue to be bombarded with unwanted email and other correspondence as a result of the membership. This "pollution" can detract from the community and collaborative computing experience and can be frustrating to users who are put in the position of having to track down an administrator to made changes to the member's account or remove the member. Additionally, administrators who add these groups have no way to determine which members of the group are interested and actively participating in the community.

It is desirable to have a method and system which overcomes the above-described deficiencies and which allows users greater control over their memberships in a collaborative computing community. It is particularly desirable to have a method and system which provides users within a collaborative computing community group the ability to manage their membership in the community in a manner which is separate from the management of the group and the group's membership in the community.

SUMMARY OF THE INVENTION

The present invention addresses the deficiencies of the art in respect to managing membership within a collaborative community and provides a novel and non-obvious method and system and apparatus therefore.

Methods consistent with the present invention provide a method for managing membership in a collaborative computing environment community in which identification of a selected a group of end user persons to invite to join the collaborative computing community is received. The selected group is evaluated to identify one or more invitees there from. The one or more identified invitees are invited to join the community and an indication from one or more invitees that the invitee wishes to join the community is received.

Systems consistent with the present invention include a system for managing membership in a networked collaborative computing environment community in which the system has a first workstation and a collaborative computing server in data communication with the first workstation via the network. The collaborative computing server is operative to receive identification from the first workstation of a selected a group of end user persons to invite to join the collaborative computing community, evaluate the selected group to identify one or more invitees there from, send a notification to the one or more invitees extending an invitation to join the collaborative computing community and receive an indication from one or more invitees that the invitee wishes to join the community.

In accordance with another aspect, the present invention provides a computer-readable storage medium storing a computer program which when executed performs a collaborative computing community invitation method in which identification of a selected a group of end user persons to invite to join the collaborative computing community is received. The selected group is evaluated to identify one or more invitees there from. The one or more identified invitees are invited to join the community and an indication from one or more invitees that the invitee wishes to join the community is received.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

Figure 1:
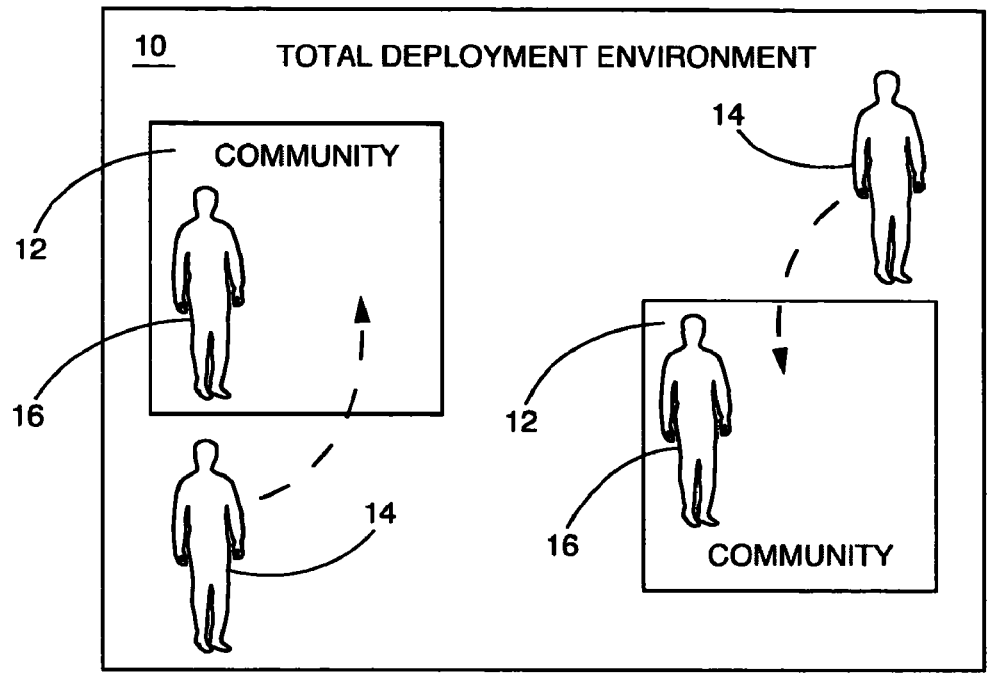
FIG. 1 is a block diagram of a hierarchy of a typical collaborative computing deployment environment constructed in accordance with the principles of the present invention.

The present invention is a method and system for managing collaborative computing environment membership using invitation management. Referring now to the drawing figures in which like reference designators refer to like elements, there is shown in FIG. 1 a block diagram of a hierarchy of a typical collaborative computing deployment environment constructed in accordance with the principles of the present invention and designated generally as 10. Each collaborative computing deployment environment 10 includes one or more communities 12. Each community 12 represents a collaborative computing community provided within total collaborative computing deployment environment 10. Communities 12 can be populated by end user persons 14 who become members 16 thereof. One or more end user persons 14 can be arranged into groups 16. In accordance with the principles of the present invention, grouped end user persons can be invited to become members of a community 12. The membership invitation process is described in detail below.

Members 16 are assigned roles within their respective communities. For example, the context of a community may be that of a software development collaborative computing environment and may include roles such as development manager, architect and software developer. The roles of manager, architect and software developer may have different responsibilities and privileges within the community.

Figure 2:
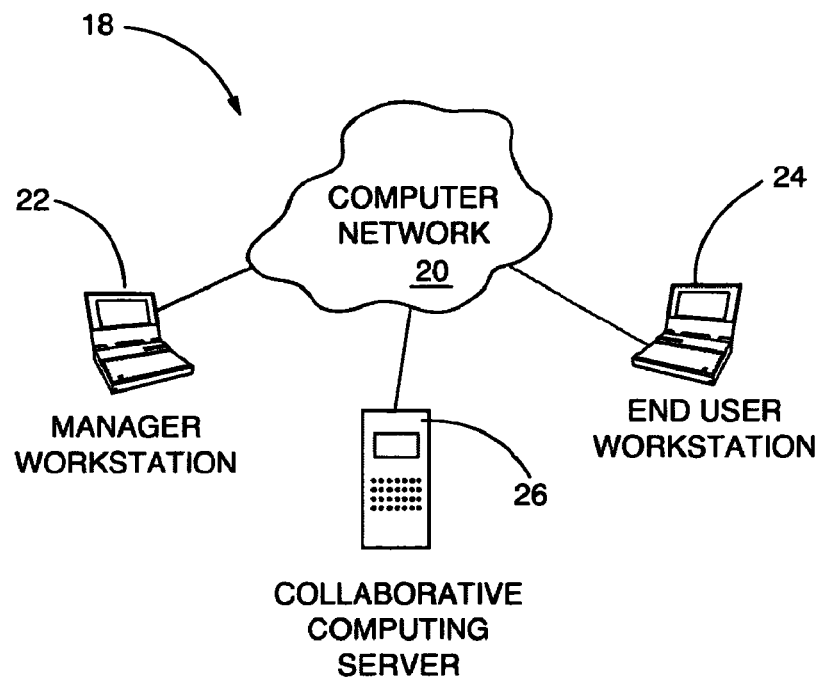
FIG. 2 is an iconic diagram of a collaborative computing system constructed in accordance with the principles of the present invention.

A collaborative computing system constructed in accordance with the principles of the present invention is explained with reference to FIG. 2. System 18 includes computer network 20 to which is coupled manager workstation 22, end user workstation 24 and collaborative computing server 26. Computer network 20 can be any network known in the art for facilitating the transmission of information from one computing device to another using any known communication protocol.

Manager workstation 22, end user workstation 24 and collaborative computing server 26 can be any computing devices capable of performing the functions described herein. For example, a typical combination of hardware and software could be a general purpose computer having a central processing unit and a computer program stored on a storage medium that, when loaded and executed, controls the computer system such that it carries out the methods and functions described herein. The present invention can also be embedded in one or more computer program products which comprise all the features enabling the implementation of the methods described herein, and which, when loaded in a computer system is able to carry out these methods. The storage medium can be any volatile or non-volatile storage device.

Manager workstation 22 and end user workstation 24 can, for example, be any microprocessor-based computing device such as a desktop or laptop computer, personal digital assistant (PDA), hand held computer, etc. running any suitable operating system and providing the user with a display and input device such as a keyboard, touch screen, mouse, and the like. It is presumed that one of ordinary skill in the art could appropriately size the components of workstations 22 and 24 and collaborative computing server 26 to accommodate the expected demands placed on these devices during operation of system 18. No physical distinction is intended herein between workstations 22 and 24. Rather to ease understanding of the present invention, manager workstation 22 refers to the computing device used by the person who is initiating invitation into the community or managing invited and active members and end user workstation 24 refers to the computing device used by a person being invited to join the collaborative computing community.

Collaborative computing server 26 is arranged to store the databases described herein and executes the software which provides deployment environment 10 and communities 12. In operation, a manager, administrator or other user operates manager workstation 22 which communicates with collaborative computing server 26 to invite members and manage membership. As such, an invited end user person 14 uses end user workstation 24 to communicate with collaborative computing server 26 during the membership invitation process.

The overall membership process of the present invention is described with reference to FIG. 3. Initially, it is noted that the subject invention is described with respect to the invitation of a group of end user persons 14 and not with respect to the invitation membership process for a single end user person 14, it being understood that the invitation and membership process for a single end user person 14 is a simplified version of the process described with respect to the invitation of an entire group. If it is determined, for example, by collaborative computing server 26 in conjunction with manager workstation 22 that a group is to be added (step S100), collaborative computing server 26 in conjunction with manager workstation 22 and the inviting member 16 (or end user person 14) performs invitation processing (step S102). Invitation processing is described in detail below. In simplified form, invitation processing as part of step S102 involves selecting a group to be invited into the community, making appropriate configuration settings on collaborative computing server 26 to support the invited end user persons 14 and inviting the group participants to join the community.

If no users join the community (step S104), the process reverts back to the beginning. If one or more users elect to join the community (step S104), system 18 performs membership processing (step S106). As part of the invitation process (step S102), invitees are provided with the ability to join the community through any suitable means, such as selecting a hypertext mark-up language (HTML) link or other means for indicating a desire to join the community. Membership processing is described in detail below and includes verification and access control to ensure that the enrolling end user person 14 was in fact invited, that the invitation is still valid and that it is ok to join the community. Membership processing also involves updating the various databases to indicate community membership.

Of note, once an end user person 14 becomes a member 16 of a community 12, that person remains a member even if the group from which the member originally joined the community is removed from the community. In other words, once a member joins a community, that person remains a member if the group is deleted. If an administrator or other authorized user wishes to remove an active member (step S108), system 18 performs active member removal processing (step S110). Active member removal processing is described in detail below.

It is also possible that an administrator or other authorized user may wish to remove an invited member from the invitation list after the invitation to join the community has been extended but before the invited end user person 14 has accepted the invitation and joined the community. If an invited member is to be removed, (step S112) system 18 performs invited member removal processing (step S114). In the case of invited member removal processing, a manger or other authorized user will, via manager workstation 22, be presented with a list of invited end user persons 14. The manger selects the invitee to remove and the selection is communicated to collaborative computing server 26 which updates the appropriate databases to indicate that the selected end user person 14 is no longer invited to join the community 12.

Figure 3:
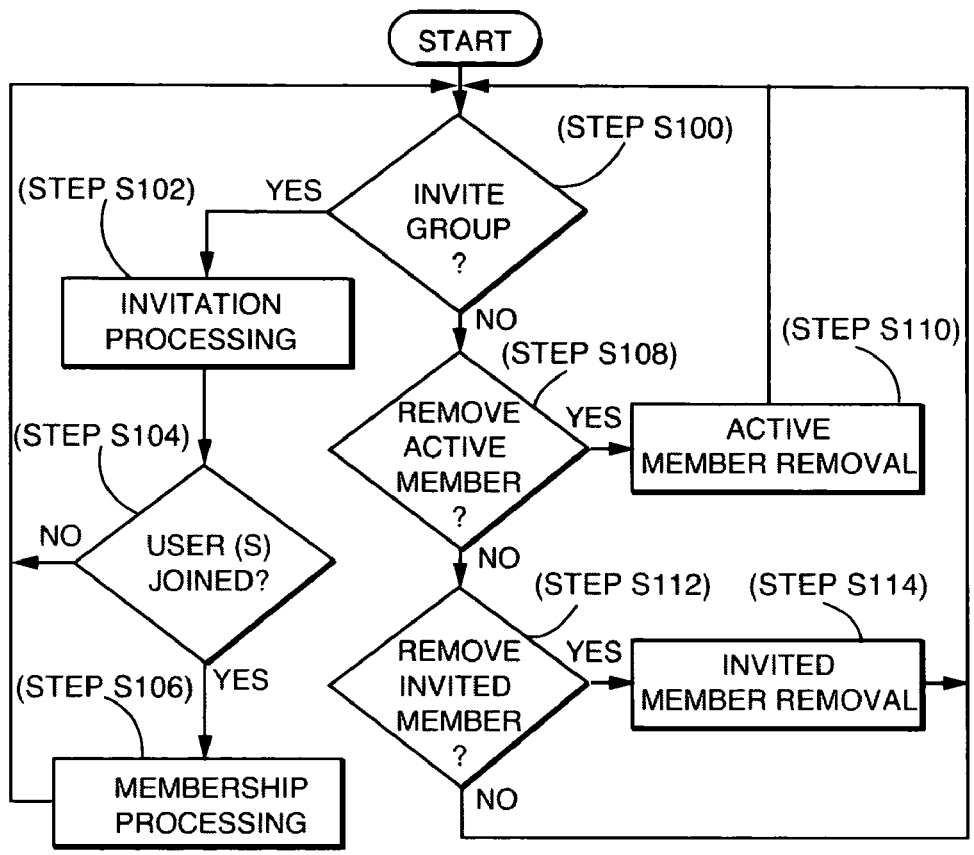
FIG. 3 is a flow chart of the overall membership process of the present invention.

Of note, although FIG. 3 shows the invite group (step S100), remove active member decision (step S108) and remove invited member decision (step S112) sequentially, it is understood that this arrangement is purely for ease of explanation and that these steps are not presented in any particular order. As such, a manger or other authorized user can interact with system 18 to perform the corresponding functions as needed.

Figure 4:
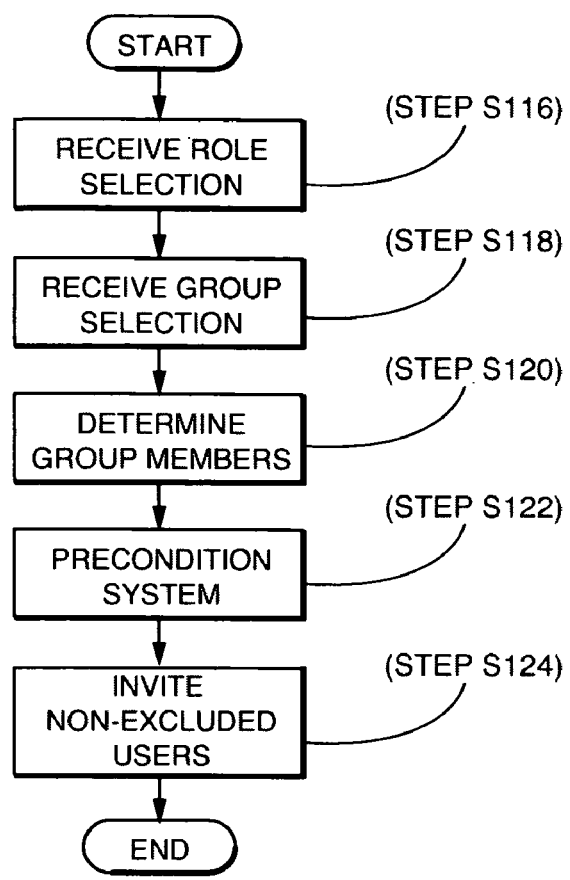
FIG. 4 is a flow chart of invitation processing within the present invention.

Invitation processing (step S102) is explained in detail with reference to FIG. 4. When a manager or other authorized user indicates his or her desire to invite a group to join the community, collaborative computing server 24 provides a list of roles within the community from which the manager can select. The manager indicates his or her role selection(s) which is transmitted to and received by collaborative computing server 26 (step S116). The manager then selects the group he or she wishes to invite to join the community. This selection is received by collaborative computing server 26 (step S118). Collaborative computing server 26 expands the group to identify which end user persons 14 are members of the selected group (step S120). As part of this step, if such behavior is desired, collaborative computing server 24 may compare the group members with current members of the community to ensure that current community members are not once again invited to join the community.

Collaborative computing server 26 preconditions its databases and other components so that an end user person 14 can become a community member 16 if the invited end user person 14 accepts the invitation. In other words, collaborative computing server 24 makes appropriate database table entries and puts appropriate resource access controls in place to allow an invited user to become a member 16. A database entry is made for the group, and the group is granted access to the resource. This will allow an invited member to access the resource, so that the community can be listed and visited. When the member visits, a check is made to determine if this is the first visit by this member. If this is the first visit by the member, the community membership list has this member added, so that access is granted via the group and membership is granted independently of the access.

In any collaborative computing environment, it may be desirable and necessary to exclude end user persons 14 from participation in a community. Such may be the case if an end user person 14 is known to be disruptive within a particular community or is otherwise undesirable. It is contemplated that system 18, and in particular collaborative computing server 26, includes an "excluded" role for each community 12 to track excluded end user persons 14.

Referring again to FIG. 4, system 18 via collaborative computing server 26 checks the potential list of invitees and extends invitations to join the community for those members of the group which are not excluded (step S124). The invitation can be in any suitable form such as e-mail containing an HTML link to a web page which allows the user to join or affirmatively decline membership in the community 12. Of course, any suitable means for extending an invitation to an end user person 14 via computer network 20 or any other method of communication can be used.

Figure 5:
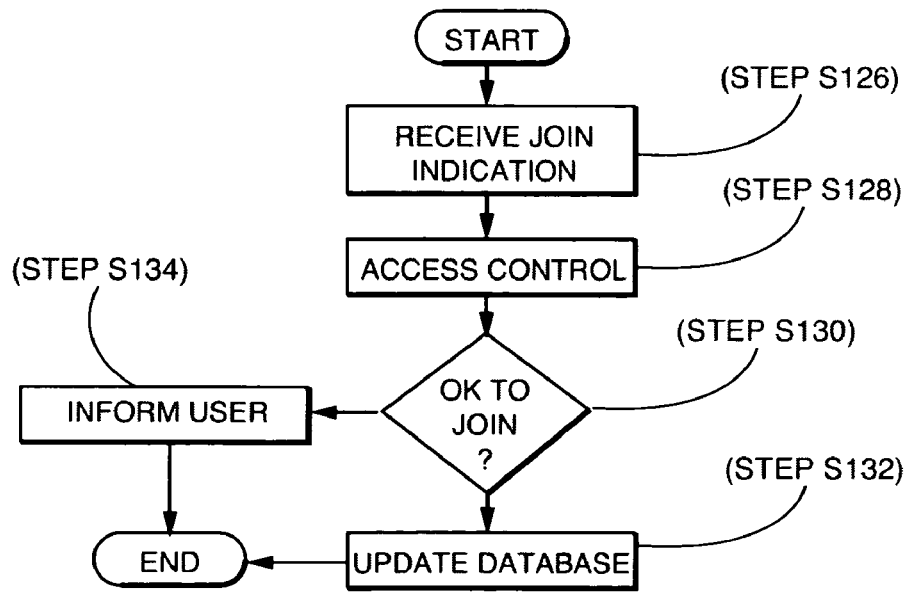
FIG. 5 is a flow chart of membership processing within the present invention.

Membership processing (step S106) is explained in detail with reference to FIG. 5. Once invited, end user person 14 indicates that they want to join the group by navigating to a uniform resource locator (URL) for the community, for example by selecting the HTML link from the invitation e-mail received. Of course, other methods for indicating a desire to accept the join invitation can be used. Collaborative computing server 26 receives the join indication from the invitee (step S126) by virtue of navigation to the URL, selection of a "join" button within a web page, etc.

Collaborative computing server 26 performs access control processing (step S128) to determine whether the user is permitted to join the community. In so doing, collaborative computing server 26 verifies that the invited end user person 14 is in the membership list and is not otherwise excluded from joining. A determination is also made as to whether the end user person 14 is still an invited member as discussed above with respect to step S114. If the user is permitted to join the community (step S130), the appropriate databases in collaborative computing server 26 are updated to reflect end user person's 14 new status as a member 16 of the community 12 (step S132). If the user is not permitted to join (step S130), a message or other indication is provided to the invited user to inform him or her of his or her ineligible status (step S134).

Figure 6:
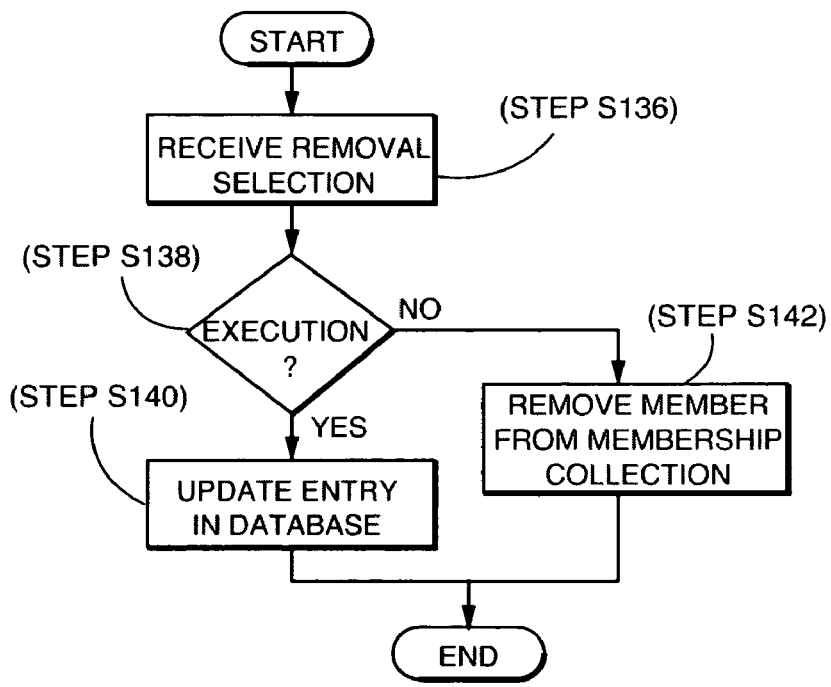
FIG. 6 is a flow chart of active member removal processing within the present invention.

Active member removal (step S110) is described with reference to FIG. 6. Once a manager or other authorized user indicates his or her desire to remove an active member, the manager is provided with a list of active members (step not shown). The manager, via manager workstation 22 indicates his or her selections which are transmitted to and received by collaborative computing server 26 (step S136). The manager also indicates whether or not the member being removed is to be excluded so that the member cannot later re-join the community individually or through another group. If the removed member is to be excluded (step S138) an appropriate entry is made in the database in collaborative computing server 26 (step S140), indicating that the removed member has an excluded role. If the member is to be removed but not excluded, such as may be the case where the member 16 requests removal, database entries are made to remove the member from the membership collection (step S142).

The present invention advantageously provides a system and method by which end user persons 16 can be added to a community 12 through an invitation opt-in process. In this manner, community 12 ends up with members who want to be part of the community rather than members who became members by virtue of their inclusion in a group. Further, the present invention advantageously provides a mechanism by which members who wish to remain in a community can do so even if their corresponding group is removed from the community. In addition, because the present invention allows management of members in an individual capacity despite their initial membership in the community by virtue of their inclusion in a group, members can be provided with the ability to leave the community in a manner which is independent from that of the group. As such, the present invention avoids the need for a member 16 who wishes to leave a community 12 to have to track down an administrator or other manger to affect removal.

The present invention can be realized in hardware, software, or a combination of hardware and software. For example, the invitation data relating to users and members can be stored in a database. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A computerized method for managing membership in a collaborative computing environment community, the method comprising:
    receiving, by a computer hardware system, identification of a selected group of end user persons to invite to join the collaborative computing community;
    evaluating, by the computer hardware system, the selected group to identify one or more invitees there from;
    inviting the one or more identified invitees; and
    receiving, by the computer hardware system, an indication from one or more invitees that the invitee wishes to join the community.

2. The method of claim 1, wherein evaluating the selected group includes determining whether any members of the selected group are already members of the community, the identified invitees being members of the selected group who are not already members of the community.

3. The method of claim 1, wherein evaluating the selected group includes determining whether any members of the selected group are excluded from the community, the one or more identified invitees being members of the selected group who are not excluded from the community.

4. The method of claim 1, further comprising further performing access control processing to determine whether an invitee who has accepted the invitation to join the community is authorized to join the community.

5. The method of claim 1, further comprising removing a group from the community, wherein members of the community who are members of the removed group are not removed as members of the community.

6. The method of claim 1, wherein inviting one or more identified invitees includes sending an electronic mail message to each of the identified invitees, the electronic mail message including a hyperlink, which can be selected to indicate a desire to join the community.

7. The method of claim 2, wherein evaluating the selected group includes determining whether any members of the selected group are excluded from the community, the one or more identified invitees being members of the selected group who are not excluded from the community.

8. A computer-readable storage medium storing a computer program which when executed performs a collaborative computing community invitation method comprising:
    receiving identification of a selected group of end user persons to invite to join the collaborative computing community;
    evaluating the selected group to identify one or more invitees there from;
    inviting the one or more identified invitees; and
    receiving an indication from one or more invitees that the invitee wishes to join the community.

9. The computer-readable storage medium of claim 8, wherein evaluating the selected group includes determining whether any members of the selected group are already members of the community, the identified invitees being members of the selected group who are not already members of the community.

10. The computer-readable storage medium of claim 8, wherein evaluating the selected group includes determining whether any members of the selected group are excluded from the community, the one or more identified invitees being members of the selected group who are not excluded from the community.

11. The computer-readable storage medium of claim 8, wherein the method performed by the stored computer program when executed further includes performing access control processing to determine whether an invitee who has accepted the invitation to join the community is authorized to join the community.

12. The computer-readable storage medium of claim 8, wherein the method performed by the stored computer program when executed further includes removing a group from the community, wherein members of the community who are members of the removed group are not removed as members of the community.

13. The computer-readable storage medium of claim 8, wherein inviting one or more identified invitees includes sending an electronic mail message to each of the identified invitees, the electronic mail message including a hyperlink, which can be selected to indicate a desire to join the community.

14. The computer-readable storage medium of claim 9, wherein evaluating the selected group includes determining whether any members of the selected group are excluded from the community, the one or more identified invitees being members of the selected group who are not excluded from the community.

15. A system for managing membership in a networked collaborative computing environment community, the system comprising:
    a first workstation; and
    a collaborative computing server in data communication with the first workstation via the network, the collaborative computing server being operative to:
        receive identification from the first workstation of a selected group of end user persons to invite to join the collaborative computing community;
        evaluate the selected group to identify one or more invitees there from;
        send a notification to the one or more invitees extending an invitation to join the collaborative computing community; and
        receive an indication from one or more invitees that the invitee wishes to join the community.

16. The system of claim 15, wherein evaluating the selected group includes determining whether any members of the selected group are already members of the community, the identified invitees being members of the selected group who are not already members of the community.

17. The system of claim 15, wherein evaluating the selected group includes determining whether any members of the selected group are excluded from the community, the one or more identified invitees being members of the selected group who are not excluded from the community.

18. The system of claim 15, wherein the collaborative computing server is further operative to perform access control processing to determine whether an invitee who has accepted the invitation to join the community is authorized to join the community.

19. The system of claim 15, wherein the collaborative computing server is further operative to remove a group from the community, wherein members of the community who are members of the removed group are not removed as members of the community.

20. The system of claim 15, wherein the system further comprises one or more second workstations in data communication with the collaborative computing server via the network, and wherein inviting one or more identified invitees includes sending an electronic mail message to the second workstation corresponding to each of the identified invitees, the electronic mail message including a hyperlink, which can be selected to indicate a desire to join the community.

* * * * *